United States Patent
Daly et al.

[15] 3,702,605
[45] Nov. 14, 1972

[54] CELL DISPERSAL METHOD FOR MONKEY KIDNEY TISSUE

[72] Inventors: William F. Daly, Hillsdale; Ronald J. Vallancourt, Park Ridge, both of N.J.

[73] Assignee: American Cyanamid Company, Stamford, Conn.

[22] Filed: May 17, 1971

[21] Appl. No.: 144,405

[52] U.S. Cl. .................................128/1 R, 195/1.8
[51] Int. Cl. ..............................................A61b 19/00
[58] Field of Search..........128/1 R; 195/1.7, 1.8, 127

[56] References Cited

UNITED STATES PATENTS

| 2,958,517 | 11/1960 | Harker et al.................195/1.7 |
| 3,172,546 | 3/1965 | Schreiner.................195/1.7 X |
| 3,249,504 | 5/1966 | Cappel et al................195/1.7 |
| 3,490,438 | 1/1970 | Lavender et al. ..........128/1 R |
| 3,545,221 | 12/1970 | Swenson et al.........128/1 R X |
| 3,579,423 | 5/1971 | Yamane et al..............195/1.7 |

Primary Examiner—Dalton L. Truluck
Attorney—Stephen Raines

[57] ABSTRACT

A method for increasing the cell yield from mammalian kidney tissue by perfusion of the decapsulated kidney *in situ* with a proteolytic enzyme under pressure and a means for dispersal of the cells by mechanical agitation.

11 Claims, No Drawings

CELL DISPERSAL METHOD FOR MONKEY KIDNEY TISSUE

BACKGROUND OF THE INVENTION

In the preparation of vaccines, cells from kidney tissue are frequently used for culturing a virus, such as monkey kidney tissue for the poliomyelitis virus. Prior to this invention, cells of kidney tissue origin were obtained by removal of the kidney prior to treatment with a trypsin solution to digest unwanted intercellular material or by introducing a trypsin solution by way of the descending aorta or left ventricle into a monkey overdosed with an anesthetic such as phenobarbital, ether, etc. and allowing it to flush by gravity flow through the kidney in situ. The expense required in maintaining large animal colonies, carrying out surgical techniques on animals, and separating the kidney tissue cells is very considerable. In an effort to minimize this expense, the pharmaceutical industry has searched for methods to maximize the yield of kidney tissue cells obtained from each animal, thus enabling the maintenance of smaller animal colonies and to minimize the surgical and separation procedures.

SUMMARY OF THE INVENTION

The present invention provides a method for increasing the yield of mammalian kidney tissue cells, more specifically, monkey, rabbit, and dog kidney tissue cells, by perfusion of the kidneys, preferably in their decapsulated state, under pressure and controlled temperatures. The perfusion is carried out using a calculated volume of proteolytic enzyme, preferably trypsin, in a suitable solution for injection which may contain components such as buffers, preservatives, etc. Other useful proteolytic enzymes are pancreatin, collagenase, etc. This solution is introduced under pressure directly into the vascular system of the mammal, preferably into the renal artery and is maintained at a constant temperature, at or above room temperature during the procedure. The renal veins and ureters are severed and renal capsule removed to permit rapid drainage of the spent enzyme solution. Following this the kidneys are removed and cell dispersal accomplished by mechanical stirring. No additional proteolytic enzyme is required following the in situ perfusion.

In accordance with this invention, a suitable mammal is operated upon utilizing the accepted techniques designed to clear the surgical area. The kidneys may be isolated by severing any matter connected to them except for the renal arteries and veins. This includes severing of the ureter to each kidney. One or more punctures are made in the abdominal aorta at or near the point of emergence of the renal arteries and cannulae inserted through the puncture or punctures into both renal arteries. A buffered solution of a proteolytic enzyme is introduced under a pressure of just above 0 to 15 lbs. per sq. in. The concentration of the proteolytic enzyme may vary slightly. The volume of solution can be varied from about 300 milliliters to about 1000 milliliters. When trypsin is employed, satisfactory results were obtained with 600 milliliters of a solution of about 0.25 percent of a 1:250 grade trypsin in buffered saline solution, although volumes of about 1000 ml. could also be employed. It may be noted that 1:250 grade trypsin gave somewhat better results than pure trypsin. The renal veins and ureters are severed to permit rapid drainage of the spent trypsin, and the renal capsules removed to allow for both drainage and expansion of the kidneys. After the perfusion is completed, the remaining vessels (renal arteries) are severed and the kidneys are removed, placed in a suitable container and the tissue from the kidneys is mechanically stirred in a growth medium, such as Melnick's, Eagle's BME, Eagle's MEM, Morgan's 199, or Hank's Lactal, until cell dispersal is complete. Gross particles may be removed by filtration. While additional trypsin may be added to further effect the digestion of intercellular material, it is not considered necessary.

The cells upon completion of the dispersion are suitable for in vitro cultivation (Table V).

While the most significant improvement over earlier methods of cell dispersal for kidney tissue is the use of pressure, removal of the renal capsule, injecting the enzyme solution directly into the renal arteries and cutting the renal veins, numerous other improvements have been incorporated in order to optimize yields. These additional improvements consist of the following:

a. Utilization of a temperature of about 36° C. to 38° C.
b. The use of a technique resulting in the slow exsanguination of the animal.
c. Utilization of a technique which caused the pressure to be uniformly decreased, that is in contrast to a pulsating type pressure.
d. Cell dispersal accomplished through only mechanical agitation following the *in situ* perfusion. Trypsin not being necessary in this step.

While relying on a technique that employs introducing the solution under pressure into a kidney in which the renal capsule has been removed with less than all the modifications one obtains 100 to 200 percent increases in yields of viable cells (Table II) over earlier techniques. However, the ideal conditions which incorporate all of the aforementioned modifications raise the yields even more significantly (Table III). Thus depending upon equipment available, objectives, etc.; one may incorporate some or all of the modifications described by Applicants in practicing Applicants' invention.

Table IV summarizes cell yields wherein one kidney was perfused and the other not perfused.

Table V summarizes the results when four monkeys intended for polio virus production were studied. In each case, one kidney was perfused and one kidney was not perfused.

DETAILED DESCRIPTION OF THE PREFERRED EMBODIMENT

EXAMPLE 1

A series of 24 monkeys (rhesus and cercopithecus) were prepared for surgery. That is, the monkeys were anesthetized, hair was removed from all but the head, tail and lower legs, the animals were washed with surgical soap and the hairless areas were painted with an iodine solution. The above procedure renders the operating field free of extraneous material which could cause contamination.

Each animal was placed head down, with its body at a 45° angle. The exsanguination of the animal took place slowly, usually by cardiac puncture. The entire operative field was swabbed with an alcohol solution and covered with a self adhesive, sterile, antistatic plastic disposable drape such as steri-drape 1050 (Minnesota Mining and Mfg. Co.). Starting in close proximity to the clavicle, a skin incision was made caudally over the thoracic area along a line midway between the spinal column and the sternum continuing over the abdomen along a line midway between the spinal column and the linea alba and extending to the groin region. The incision crosses tranversely just anterior to the pelvis to the opposite side of the monkey where it is then directed cranially following a similar course. The skin was now removed and reflected cranially. The abdominal cavity was opened at a point above the urinary bladder. The abdominal musculature was cut, following the same course as the skin incision. The diaphragm was punctured and the ribs and intercostal muscles were cut. The diaphragm and mediastinal attachments to the sternum were severed allowing all structures mentioned to be reflected cranially or removed completely thus exposing the heart and lungs. The descending colon was looped outside the abdominal cavity. The attachment of the mesentery to the colon (descending and transverse) was severed at a point in close proximity to the bowel wall. The gastrorenal ligament was severed thus freeing the right kidney from its attachment to the stomach. The attachments of the ascending colon and caecum to the dorsal body wall were severed and the bowel was reflected cranially. The remnant of the right diaphragm was cut along the muscular attachment to the ribs. The posterior vena cava and the abdominal aorta were exposed and clamped off just anterior to their bifurcation into the common iliac arteries and veins. The posterior vena cava was bisected anterior to the hemostat and was freed from its fibrous attachments up to the point of entry of the renal veins. A hemostat was applied to the bisected end of the vein. The phrenicolienel ligament was severed and the spleen and pancreas reflected cranially. The remnant of the left diaphragm was cut along the muscular attachment to the ribs. The thoracic aorta was clamped at a point midway between the heart and the vestigial aortic hiatus.

The adrenal glands were dissected from the cephalic pole of the respective kidneys. The fibrous band of tissue connecting the kidneys to the dorsal body wall was severed. The ureters were exposed and bisected. Each kidney was now held to the body wall by the respective renal arteries and veins only. The abdominal aorta and the renal arteries were exposed. A puncture was made in the aorta at the point of emergence of the renal arteries. Cannulae of suitable bore size (20–22 gauge) and length (one-fourth inch to 1 inch) were inserted through the punctured aorta and into the left and right renal arteries. To insure that the cannulae are not forced out of the arteries when pressure is applied during the procedure, a ligature was placed around each artery at the point of emergence from the aorta. Plastic tubing was connected to each cannula leading to a plastic bag such as is used for the collection and/or storage of blood or blood products containing 600 ml. of 0.25 percent trypsin solution (1:250 grade trypsin in phosphate buffered saline, Dulbecco) at 21°–43° C. It proved advantageous to maintain the temperature at 37.8°C. One procedure used was to immerse the plastic bags in a water bath. An initial pressure of 0–6 p.s.i. was applied to each plastic bag. A conventional hand press was one method used. A second method was to place metal weights on the plastic bags. The renal veins were immediately severed to permit drainage of the spent trypsin and the renal capsule was stripped from each kidney to allow for expansion. The procedure was contained for an average of 30 – 35 minutes until the 300 ml. to 1000 ml. of trypsin solution had perfused each kidney. Each pair of kidneys were removed by standard technique and placed in a flask containing 300 ml. of a buffered growth medium with added lactal albumin hydrolysate and calf serum, such as Melnick's Medium "A." Continuous mechanical stirring was performed until cell dispersal was complete (approximately 15 minutes). The cell suspension was transferred to a cell collecting flask through fine stainless steel mesh to remove gross particles. A sample was removed for the viable cell count. Viable cell counts were made using the method of dye exclusion (Trypan blue) as described by Pappenheimer, Jr. Experimental Medicine 25, 633 (1917), and McLemans, Jr. Bact. 74, 768 (1957). The results appear in Tables I – V.

TABLE I

| Weight of Dog | Cell Yields in Millions of Viable Cells |
| --- | --- |
| 10 ½ lbs. | 1,620 perfused |
| 11 lbs. | 1,532 non-perfused |
| 9 ¾ lbs. | 1,226 non-perfused |
| 14 ½ lbs. | 1,380 non-perfused |
| 12 lbs. | 1,520 non-perfused |

% Increase = 14.52

TABLE II

Experimental Conditions (Room Temperature [21°–32°] Pulsating pressure, cut veins and cut ureters)

| Type of Monkey | Millions of Viable cells/Monkey | Percent Increase Over Control |
| --- | --- | --- |
| Rhesus | 636 | 98.8 |
| " | 747 | 133.4 |
| " | 927 | 189.7 |
| " | 537 | 67.8 |
| Cercopithecus | 684 | 113.8 |
| " | 927 | 189.7 |
| " | 531 | 65.9 |
| " | 618 | 93.1 |
| " | 1065 | 232.8 |
| " | 501 | 56.6 |
| Rhesus | 531 | 65.9 |
| " | 699 | 118.4 |
| " | 492 | 53.8 |
| Cercopithecus | 525 | 64.1 |
| " | 450 | 40.6 |
| " | 777 | 142.8 |
| " | 789 | 146.6 |

| Type of Monkey | Millions of Viable cells/Monkey | Percent Increase Over Control |
|---|---|---|
| " | 513 | 60.3 |
| " | 537 | 67.8 |
| " | 660 | 106.2 |
| " | 675 | 110.9 |
| " | 459 | 43.4 |
| Rhesus | 468 | 46.2 |
| " | 1014 | 220.1 |
| Control* | Av. 657 320 * | Av. 105 0 |

* The control for this experiment consisted of 100 monkeys where kidneys were processed by the method of Youngner, J.S., *Proceedings of the Society for Experimental Biology and Medicine* 85, 202–205 (1954), and Bodian, D., *Virology*, 2, 575 (1956), and for which the average yield of viable cells per monkey was 320 million.

TABLE III

Experimental Conditions

Temp. 36°–38° C. Uniform Decreasing Pressure (3.5 psi to 0 psi) Slow exsanguination and rapid transfer to a growth media.

| Type of Monkey | Millions of Viable cells/Monkey | Percent Increase Over Control |
|---|---|---|
| Rhesus | 720 | 125.0 |
| " | 879 | 174.7 |
| " | 666 | 108.1 |
| " | 633 | 97.8 |
| " | 600 | 87.5 |
| " | 834 | 160.6 |
| " | 528 | 65.0 |
| " | 699 | 109.1 |
| " | 480 | 50.0 |
| " | 723 | 125.9 |
| " | 534 | 66.9 |
| " | 690 | 115.6 |
| " | 645 | 101.6 |
| " | 780 | 143.8 |
| " | 540 | 68.8 |
| " | 930 | 190.6 |
| " | 879 | 174.7 |
| " | 750 | 134.4 |
| " | 924 | 188.8 |
| " | 924 | 188.8 |
| " | 798 | 149.4 |
| " | 684 | 113.8 |
| " | 522 | 63.1 |
| " | 837 | 161.6 |
| " | 504 | 57.5 |
| " | 726 | 126.9 |
| " | 648 | 102.5 |
| " | 858 | 168.1 |
| " | 798 | 149.4 |
| " | 798 | 149.4 |
| " | 978 | 205.6 |
| " | 1– | 216.9 |
| " | 768 | 140.0 |
| " | 702 | 119.4 |
| " | 612 | 91.3 |
| " | 846 | 164.4 |
| " | 1128 | 252.5 |
| " | 594 | 85.6 |
| " | 459 | 43.4 |
| " | 639 | 99.7 |
| " | 924 | 188.8 |
| " | 573 | 79.1 |
| " | 795 | 148.4 |
| " | 921 | 187.8 |
| " | 636 | 98.8 |
| " | 834 | 160.6 |
| " | 768 | 140.4 |
| " | 834 | 160.6 |
| " | 885 | 176.6 |
| " | 997 | 211.6 |
| 37 | 804 | 151.3 |
| " | 441 | 37.8 |
| " | 693 | 116.6 |
| " | 555 | 73.4 |
| " | 630 | 96.9 |
| " | 705 | 120.3 |
| Rhesus | 711 | 122.2 |
| " | 906 | 183.1 |
| " | 714 | 123.1 |
| " | 750 | 134.4 |
| " | 825 | 157.8 |
| " | 900 | 181.3 |
| " | 765 | 139.1 |
| " | 816 | 155.0 |
| " | 930 | 190.6 |
| " | 840 | 162.5 |
| " | 720 | 125.0 |
| " | 630 | 96.9 |
| " | 810 | 153.1 |
| " | 750 | 134.4 |
| " | 936 | 192.5 |
| " | 870 | 171.9 |
| " | 954 | 198.1 |
| " | 627 | 95.9 |
| " | 948 | 196.3 |
| " | 750 | 134.4 |
| " | 747 | 133.4 |
| " | 648 | 102.5 |
| " | 651 | 103.4 |
| " | 465 | 45.3 |
| " | 603 | 88.4 |
| " | 510 | 59.4 |
| " | 795 | 148.4 |
| " | 915 | 185.9 |
| " | 909 | 184.1 |
| " | 855 | 167.2 |
| " | 1,029 | 221.6 |
| " | 840 | 162.5 |
| " | 660 | 106.3 |
| " | 723 | 125.9 |
| " | 1,014 | 216.9 |
| " | 549 | 71.6 |
| " | 504 | 57.5 |
| " | 843 | 163.4 |
| " | 936 | 192.5 |
| " | 765 | 139.1 |
| " | 690 | 115.6 |
| " | 1,473 | 360.3 |
| " | 1,068 | 233.8 |
| " | 1,095 | 242.2 |
| " | 855 | 167.2 |
| " | 720 | 125.0 |
| " | 606 | 89.4 |
| " | 696 | 117.5 |
| " | 633 | 97.8 |
| " | 744 | 132.5 |
| " | 666 | 108.1 |
| " | 795 | 148.4 |
| Cercopithecus | 621 | 94.1 |
| " | 855 | 167.2 |
| " | 714 | 123.1 |
| " | 837 | 161.6 |
| " | 960 | 200.0 |
| " | 999 | 212.2 |
| " | 900 | 181.3 |
| Cercopithecus | 807 | 152.2 |
| " | 759 | 137.2 |
| " | 810 | 153.1 |
| " | 681 | 112.8 |
| " | 1,002 | 213.1 |
| " | 765 | 139.1 |
| " | 729 | 127.8 |
| " | 843 | 163.4 |
| " | 687 | 114.7 |
| " | 786 | 145.6 |
| " | 588 | 83.8 |
| " | 1,143 | 257.2 |
| " | 663 | 107.2 |
| " | 816 | 155.0 |
| " | 1,260 | 293.8 |
| " | 492 | 53.8 |
| " | 684 | 113.8 |
| " | 558 | 74.4 |
| " | 915 | 185.9 |
| " | 774 | 141.9 |
| " | 738 | 130.6 |
| " | 813 | 154.1 |
| " | 1,035 | 223.4 |
| " | 966 | 201.9 |
| " | 633 | 97.8 |
| " | 804 | 151.3 |
| " | 735 | 129.7 |
| " | 810 | 153.1 |
| " | 591 | 84.7 |
| " | 609 | 90.3 |
| " | 729 | 127.8 |
| " | 630 | 96.9 |
| " | 510 | 59.4 |

|    | 786   | 145.6 |
|----|-------|-------|
| "  | 948   | 196.3 |
| "  | 1,053 | 229.1 |
| "  | 702   | 119.4 |
| "  | 1,221 | 281.6 |

| Av. 770 | Av. 141 |
|---------|---------|

TABLE IV

| | Million Viable Cell per Kidney | | Percent Increase |
|---|---|---|---|
| Type of Monkey | A* | B* | by Perfusion |
| Cercopithecus | 265 | 160 | 66 |
| Cercopithecus | 152 | 128 | 19 |
| Cercopithecus | 149 | 82 | 82 |
| Rhesus | 296 | 271 | 9 |
| Rhesus | 181 | 79 | 129 |
| Rhesus | 205 | 118 | 74 |
| Rhesus | 238 | 93 | 156 |
| Average | 212 | 133 | 76 |

A* — Perfused
B* — Non-Perfused

TABLE V

| Process Method Used | Million Viable Cells/ Kidney | Cell Cultures Prepared | Growth | Control (24 days) |
|---|---|---|---|---|
| Non-Perfused | 296 | 19 | Good | Fair |
| Non-Perfused | 296 | 19 | Good | Fair |
| Perfused | 305 | 21 | Good | Good |
| Non-Perfused | 316 | 21 | Good | Good |
| Perfused | 287 | 19 | Good | Good |
| Non-Perfused | 300 | 21 | Good | Good |
| Perfused | 404 | 28 | Good | Good |
| Non-Perfused | 137 | 10 | Good | Good |
| Perfused | 165 | 13 | Good | Fair |

We claim:

1. A method for increasing the yield of mammalian kidney tissue obtained from a surgically prepared mammal having each kidney held to the body wall by the respective renal arteries and veins, (in situ) which comprises: inserting and securing cannulae into said renal arteries of said mammal; ligating the renal arteries; perfusing said kidneys with a solution introduced into said cannulae containing a proteolytic enzyme under pressure; at a temperature of 21° to 43° C. and removing a capsule from said kidneys permitting expansion caused by said solution containing a proteolytic enzyme.

2. A method as recited in claim 1 in which said ureter connected to said kidney is severed to permit rapid drainage of the spent proteolytic enzyme solution.

3. A method as recited in claim 2 in which said renal veins connected to said kidney is severed to permit rapid drainage of the spent proteolytic enzyme solution.

4. A method as recited in claim 3 wherein said mammal is a species of monkey.

5. A method as recited in claim 4 wherein said solution containing a proteolytic enzyme is a trypsin 1:250 solution.

6. A method as recited in claim 5 wherein said pressure is above 0 lb./sq. in. to about 15 lbs./sq. in. and is uniformly diminished during perfusion.

7. A method as recited in claim 6 wherein said temperature is 36°–38° C.

8. A method as recited in claim 6 wherein said solution containing said trypsin also contains components selected from the group consisting essentially of preservatives, buffers, and inorganic salts.

9. A method as recited in claim 8 wherein about 600 milliliters of said solution having about 0.25% w/v concentration of trypsin (1:250 grade trypsin in buffered saline) is used during the perfusion.

10. A method as recited in claim 9 wherein said kidney is removed after perfusion and by continuous mechanical stirring in a growth medium a uniform dispersion of kidney cells is obtained which is suitable for classic tissue culture used.

11. A method as recited in claim 2 wherein said kidney is removed after perfusion and only by continuous mechanical stirring is transformed into a cell dispersion.

* * * * *